United States Patent
Kono et al.

(10) Patent No.: US 11,543,917 B2
(45) Date of Patent: Jan. 3, 2023

(54) DISPLAY DEVICE

(71) Applicant: Japan Display Inc., Tokyo (JP)

(72) Inventors: Takaaki Kono, Tokyo (JP); Yoshio Owaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/344,437

(22) Filed: Jun. 10, 2021

(65) Prior Publication Data

US 2021/0311606 A1 Oct. 7, 2021

Related U.S. Application Data

(63) Continuation of application No. PCT/JP2019/045408, filed on Nov. 20, 2019.

(30) Foreign Application Priority Data

Dec. 10, 2018 (JP) .............................. JP2018-230647

(51) Int. Cl.
  *G06F 3/041* (2006.01)
  *G06F 3/044* (2006.01)
  *G09G 3/36* (2006.01)

(52) U.S. Cl.
  CPC ........ *G06F 3/04186* (2019.05); *G06F 3/0446* (2019.05); *G09G 3/3659* (2013.01);
  (Continued)

(58) Field of Classification Search
  CPC ............... G06F 3/04186; G06F 3/0446; G06F 2203/04107; G06F 2203/04108; G06F 3/0412; G06F 2203/04103; G09G 3/3659; G02F 1/1368; G02F 1/133; G02F 1/1333; G02F 1/1345; G09F 9/00; G09F 9/30
  See application file for complete search history.

(56) References Cited

U.S. PATENT DOCUMENTS

| 10,228,604 B1* | 3/2019 | Ghali | ................... G02F 1/13454 |
| 2011/0018560 A1* | 1/2011 | Kurashima | .......... H05K 1/0216 |
| | | | 324/679 |

(Continued)

FOREIGN PATENT DOCUMENTS

| JP | 2011-028535 A1 | 2/2011 |
| JP | 2011-100364 A | 5/2011 |

(Continued)

OTHER PUBLICATIONS

International Search Report and Written Opinion dated Feb. 4, 2020 in connection with PCT/JP2019/045408.

*Primary Examiner* — Ibrahim A Khan
(74) *Attorney, Agent, or Firm* — K&L Gates LLP

(57) ABSTRACT

An object of the present disclosure is to provide a display device that enables the prevention of forming a ghost even though a water droplet is attached. A display device includes a display panel having a semiconductor device disposed at an end portion of an array substrate, and a translucent cover member covering the display panel. The display panel includes a plurality of drive electrodes that detect an external proximity object, and a conductive layer between the translucent cover member and the semiconductor device. At least a part of the conductive layer overlaps with at least a part of the semiconductor device in a planar view.

18 Claims, 15 Drawing Sheets

(52) U.S. Cl.
CPC .............. *G06F 2203/04107* (2013.01); *G06F 2203/04108* (2013.01)

(56) References Cited

U.S. PATENT DOCUMENTS

| | | | | |
|---|---|---|---|---|
| 2011/0175671 A1* | 7/2011 | Reynolds | ............ | H03K 17/962 200/600 |
| 2011/0175845 A1 | 7/2011 | Honda et al. | | |
| 2012/0075218 A1* | 3/2012 | Lin | ............ | G06F 3/0418 345/173 |
| 2012/0087065 A1* | 4/2012 | Kim | ............ | H04B 15/02 361/679.01 |
| 2012/0103777 A1* | 5/2012 | Kang | ............ | G06F 3/0446 200/600 |
| 2013/0285952 A1* | 10/2013 | Huang | ............ | G06F 3/04166 345/173 |
| 2014/0085256 A1* | 3/2014 | Chen | ............ | G06F 3/044 200/600 |
| 2014/0132560 A1* | 5/2014 | Huang | ............ | G06F 3/041 345/174 |
| 2014/0313439 A1* | 10/2014 | Matsumoto | ............ | G06F 3/04164 349/12 |
| 2015/0220208 A1* | 8/2015 | Noguchi | ............ | G06F 3/04184 345/174 |
| 2016/0132148 A1* | 5/2016 | Han | ............ | H01L 27/323 345/174 |
| 2017/0024037 A1 | 1/2017 | Ishizaki et al. | | |
| 2017/0077213 A1* | 3/2017 | Jo | ............ | H01L 51/0097 |
| 2017/0219892 A1* | 8/2017 | Chen | ............ | H01L 27/0292 |
| 2017/0269744 A1* | 9/2017 | Gharghi | ............ | G06F 3/0443 |
| 2018/0252955 A1 | 9/2018 | Kurasawa et al. | | |
| 2019/0107909 A1* | 4/2019 | Kim | ............ | G02F 1/133514 |
| 2019/0326359 A1* | 10/2019 | Yang | ............ | G06F 3/0443 |
| 2020/0029475 A1* | 1/2020 | Park | ............ | H05K 9/0079 |
| 2021/0208715 A1* | 7/2021 | Yang | ............ | H01L 51/5221 |

FOREIGN PATENT DOCUMENTS

| | | |
|---|---|---|
| JP | 2012-174190 A | 9/2012 |
| JP | 2015-164033 A | 9/2015 |
| JP | 2017-027394 A | 2/2017 |
| JP | 2018-147116 A | 9/2019 |

\* cited by examiner

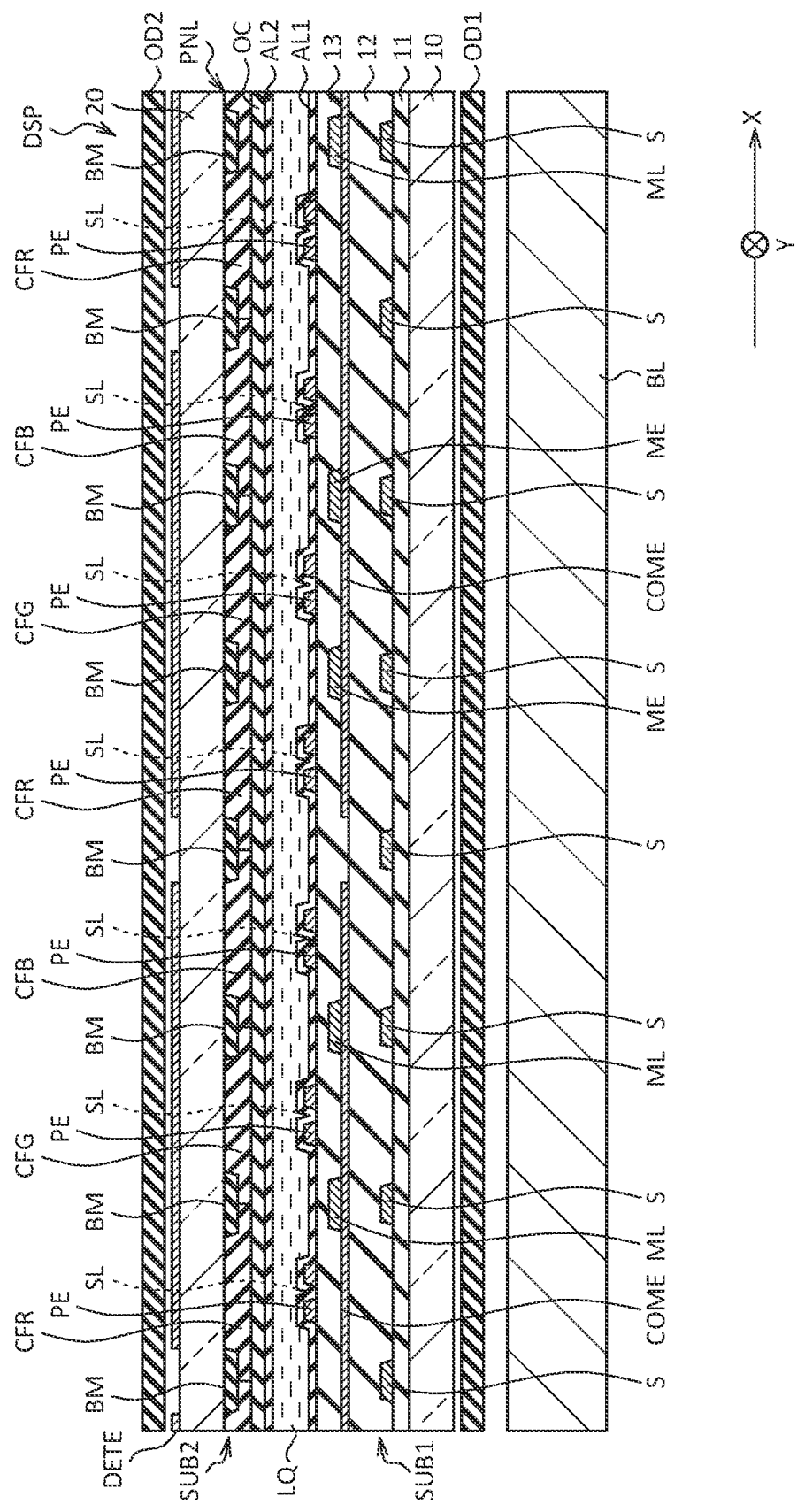

DISPLAY DEVICE

CROSS-REFERENCE TO RELATED APPLICATION

This application is a Bypass Continuation Application of PCT international Application No. PCT/JP2019/045408 filed on Nov. 20, 2019, which claims priority to Japanese Patent Application No. 2018-230647, filed on Dec. 10, 2018, the entire contents of which are incorporated herein by reference.

BACKGROUND OF THE INVENTION

The present invention relates to a display device, and is particularly applicable to a display device equipped with a touch sensor.

There are proposed a sensor-equipped display device that is an In-cell type display device, to which a self detection mode is applicable, and a driving method for the display device (e.g., Japanese Unexamined Patent Application Publication No. 2015-164033).

SUMMARY OF THE INVENTION

The front surface of the sensor-equipped display device is covered with cover glass. In the case where a water droplet is attached to the cover glass, a touch sensor sometimes makes wrong determination.

An object of the present invention is to provide a display device that enables the prevention of forming a ghost even though a water droplet is attached.

Other objects and novel features will be apparent from the description of the present specification and the accompanying drawings.

A brief description of representative ones according to the present invention is as follows.

That is, a display device includes a display panel having a semiconductor device disposed at an end portion of an array substrate, and a translucent cover member covering the display panel. The display panel includes a plurality of drive electrodes that detect an external proximity object, and a conductive layer between the translucent cover member and the semiconductor device. At least a part of the conductive layer overlaps with at least a part of the semiconductor device in a planar view.

BRIEF DESCRIPTION OF DRAWINGS

FIG. 2 is a cross sectional view showing the structure of the sensor-equipped display device according to an embodiment.

DESCRIPTION OF EMBODIMENTS

Figure 1:
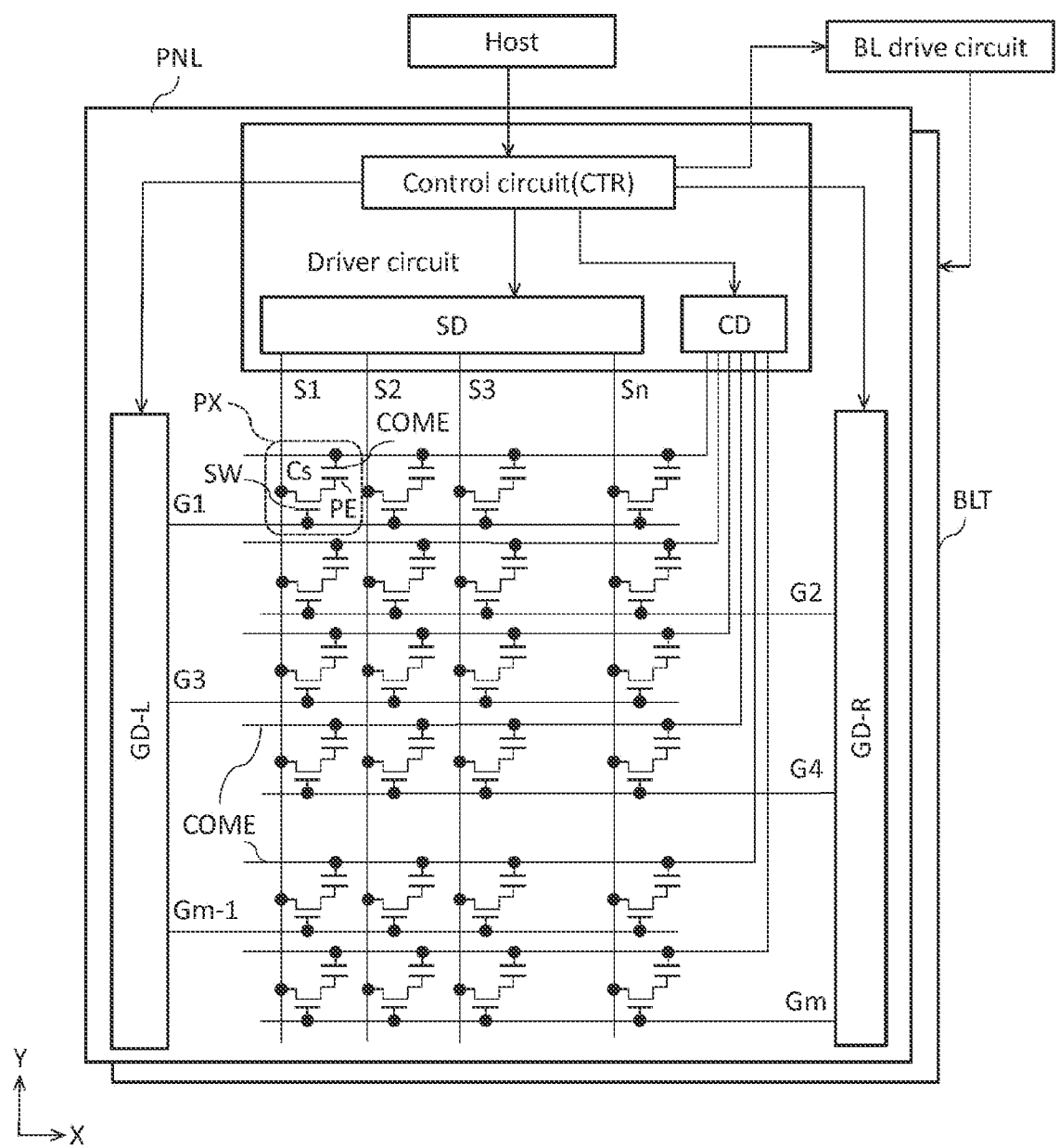
FIG. 1 is a view showing the schematic configuration of the display device of a sensor-equipped display device according to an embodiment.

In the following, embodiments of the present invention will be described with reference to the drawings.

Note that the disclosure is merely an example. Appropriate modifications easily conceived by a person skilled in the art with the gist of the invention maintained are naturally included in the scope of the present invention. Moreover, for further clarifying the description, in the drawings, the widths, thicknesses, shapes, and any other parameters of the components are sometimes schematically depicted more than in the actual forms. However, these are merely examples, and will not limit the interpretations of the present invention.

In the present specification and the drawings, components similar to the components in regard to ones described above are designated with the same reference signs, and the detailed description is appropriately omitted.

In the present embodiment, as an example of display devices, a liquid crystal display device is disclosed. This liquid crystal display device can be used for various devices, for example, including smartphones, tablet terminals, mobile telephone terminals, personal computers, television receiver sets, on-vehicle devices, and game machines.

Note that in the present specification and in the scope of claims, the expressions "upper", and "lower", for example, in describing the drawings express the relative positional relationship between a structure on which attention is focused and another structure. Specifically, in the case where the display device is viewed from the side surface, the direction going from a first substrate (an array substrate) to a second substrate (a counter substrate) is defined as "upper", and the opposite direction is defined as "lower".

The terms "inner side" and "outer side" express relative positional relationships relative to a display region in two sites. That is, the term "inner side" refers to the side relatively close to the display region to one of the sites, and the term "outer side" refers to the side relatively away from the display region to the one site. However, the definitions of the terms "inner side" and "outer side" are in a state in which the liquid crystal display device is not bent.

The term "display device" refers to general that display pictures (or images) using a display panel. The term "display panel" refers to a structure that displays pictures using an electrooptic layer. For example, the term "display panel" sometimes refers to a display cell including an electrooptic layer, or sometimes refers to a structure having a display cell mounted with other optical members (e.g., members, a backlight, a touch panel, and any other components). Here, the term "electrooptic layer" possibly includes a liquid crystal layer, an electrochromic (EC) layer, and any other layers, as long as any technical inconsistency arises. Accordingly, an embodiment, described later, will be described exemplifying a liquid crystal panel including a liquid crystal layer as a display panel. However, the application of the other electrooptic layers described above is not excluded.

(Embodiment)

FIG. 1 is a view showing the schematic configuration of a display device of a sensor-equipped display device according to an embodiment. Note that in the embodiment, the display device is a liquid crystal display device.

A sensor-equipped display device DSP includes a display panel PNL and a backlight BLT that illuminates the display panel PNL from the back surface side. The display panel is provided with a display area including display pixels PX disposed in a matrix configuration.

As shown in FIG. 1, the display area includes gate lines G (G1, G2, . . . ) extending along rows on which a plurality of display pixels PX are arrayed, source lines S (S1, S2, . . . ) extending along columns on which the plurality of display pixels PX are arrayed, and pixel switches SW each disposed near a location at which the gate line (the scanning line) G intersects with the source line (the signal line) S. Each of the plurality of display pixels PX has a pixel electrode PE and a common electrode COME, and a liquid crystal layer including liquid crystal molecules between the pixel electrode PE and the common electrode opposite to each other. A plurality of common electrodes Come extending in a plurality of row directions (in an X-direction) are disposed in a long-side direction (in a Y-direction). Note that a configuration may be provided in which the plurality of common electrodes Come extending in a plurality of long-side directions (the Y-direction) are disposed in the row direction (the X-direction).

The pixel switch SW includes a thin film transistor (TFT). The gate electrode of the pixel switch SW is electrically connected to the corresponding gate line G. The source electrode of the pixel switch SW is electrically connected to the corresponding source line S. The drain electrode of the pixel switch SW is electrically connected to the corresponding pixel electrode PE.

As drive units that drive the plurality of display pixels PX, gate drivers GD (a left-side GD-L and a right-side GD-R), a source driver SD, and a common electrode driver circuit CD are provided. A plurality of gate lines G are individually electrically connected to the outputs of the gate drivers GD. The plurality of source lines S are individually electrically connected to the outputs of the source drivers SD. A common electrode COME (the plurality of common electrodes Come) is electrically connected to the output of the common electrode driver circuit CD. FIG. 1 is depicted such that the source driver SD and the common electrode driver circuit CD are provided in a driver circuit (Driver circuit). A control circuit CTR (Control circuit) that generates the control signals for the gate drivers GD, the source driver SD, and the common electrode driver circuit is provided in the driver circuit (Driver circuit). The control circuit CTR that generates the control signal for the backlight BLT is also provided in the driver circuit (Driver circuit). Note that the driver circuit (Driver circuit) is included in a semiconductor integrated circuit (IC) that is one chip. However, the driver circuit may be composed of a plurality of chips. The control circuit CTR (Control circuit) may be provided on the outside of the display panel PNL.

The gate driver GD, the source driver SD, and the common electrode driver circuit CD may be disposed on a peripheral region (a frame region) around the display area or on a flexible substrate that is connected to the display panel PNL. The gate driver GD sequentially applies an ON-voltage to the plurality of gate lines G, and supplies the ON-voltage to the gate electrodes of the pixel switches SW that is electrically connected to the selected gate line G. Electricity is conducted between the source electrode and the drain electrode of the pixel switch SW in which the ON-voltage is supplied to the gate electrode. The source driver SD supplies output signals corresponding to the plurality of source lines S. The signal supplied to the source line S is supplied to the corresponding pixel electrode PE through the pixel switch SW in which the source electrode and the drain electrode are conducting.

From a host (Host) provided on the outside of the display panel PNL, image signals, control signals, and any other signals are inputted to the control circuit CTR (Control circuit), and the operations of the gate driver GD, the source driver SD, and the common electrode driver circuit CD are controlled by the control circuit CTR (Control circuit) disposed on the outside or inside of the display panel PNL. The control circuit CTR controls the operation of a backlight driver circuit (BL Drive Circuit), and the backlight BLT is driven by the backlight driver circuit (BL Drive Circuit).

FIG. 2 is a cross sectional view showing the structure of the sensor-equipped display device according to the embodiment.

The sensor-equipped display device DSP has an In-cell type touch sensor, including a display panel PNL, the backlight BLT, a first optical device OD1, and a second optical device OD2. In the example shown in the drawing, the display panel PNL is a liquid crystal display panel. However, the display panel PNL may be other flat panels such as an organic electroluminescent display panel. The display panel PNL shown in the drawing has a configuration corresponding to a horizontal electric field mode as the display mode. However, the display panel PNL may have a configuration corresponding to other display modes.

The display panel PNL includes a first substrate (also referred to as an array substrate) SUB1, a second substrate ((also referred to as a counter substrate) SUB2, and a liquid crystal layer LQ. The first substrate SUB1 is bonded to the second substrate SUB2 in a state in which a predetermined cell gap is formed. The liquid crystal layer LQ is retained in the cell gap between the first substrate SUB1 and the second substrate SUB2.

The first substrate SUB1 is formed using a first insulating substrate 10 such as a glass substrate or a resin substrate with optical transparency. The first substrate SUB1 includes, on the first insulating substrate 10 on the side opposite to the second substrate SUB2, the source line S, the common electrode COME, the pixel electrode PE, a first insulating film 11, a second insulating film 12, a third insulating film 13, and a first alignment film AL1, for example.

Here, the pixel electrode PE and the common electrode COME are comprised in the pixel region. The pixels are disposed in a matrix.

The first insulating film 11 is disposed on the first insulating substrate 10. Note that although not described in detail, between the first insulating substrate 10 and the first insulating film 11, the gate line G, the gate electrode of the switching device, or a semiconductor layer, for example, is disposed. The source line S is formed on the first insulating film 11. The source electrode and the drain electrode of the switching device, for example, are also formed on the first insulating film 11. In the example shown in the drawing, the source line S extends in a second direction Y in parallel with the common electrode COME.

The second insulating film 12 is disposed on the source line S and the first insulating film 11. The common electrode COME is formed on the second insulating film 12. In the example shown in the drawing, the common electrode COME is formed of a plurality of segments. The segments of the common electrode COME extend in the second direction Y and arranged in the first direction X with spacings. The common electrode COME is formed of a transparent conductive material such as Indium Tin Oxide (ITO) or Indium Zinc Oxide (IZO). Note that in the example shown in the drawing, a metal layer ML is formed on the common electrode COME, and the resistance of the common electrode COME is reduced. However, the metal layer ML may be omitted.

The third insulating film 13 is disposed on the common electrode COME, the metal layer ML, and the second insulating film 12. The pixel electrode PE is formed on the third insulating film 13. The pixel electrodes PE are located between the adjacent source lines S, and are opposite to the common electrode COME. The pixel electrodes PE have a slit SL at a position opposite to the common electrode COME. The pixel electrode PE is formed of a transparent conductive material including ITO or IZO, for example. The first alignment film AL1 covers the pixel electrode PE and the third insulating film 13.

On the other hand, the second substrate SUB2 is formed using a second insulating substrate 20 such as a glass substrate or a resin substrate with optical transparency. The second substrate SUB2 includes, on the side opposite to the first substrate SUB1 that is the second insulating substrate 20, a black matrix BM, color filters CFR, CFG, and CFB, an overcoat layer OC, and a second alignment film AL2, for example.

The black matrix BM is formed on the inner surface of the second insulating substrate 20, and defines the pixels. The color filters CFR, CFG, and CFB are formed on the inner surface of the second insulating substrate 20, and partially overlap with the black matrix BM. The color filter CFR is a red color filter, for example, the color filter CFG is a green color filter, for example, and the color filter CFB is a blue color filter, for example. The overcoat layer OC covers the color filters CFR, CFG, and CFB. The overcoat layer OC is formed of a transparent resin material. The second alignment film AL2 covers the overcoat layer OC.

The detection electrode DETE is formed on the outer surface of the second insulating substrate 20. This detection electrode DETE extends in the direction intersecting with the segments of the common electrode COME, and extends in the first direction X in the example shown in the drawing. The detection electrode DETE thus configured is formed of a transparent conductive material including ITO or IZO, for example.

The backlight BLT is disposed on the back surface side of the display panel PNL. As the backlight BLT, various forms are applicable, and any light using a light emitting diode (LED) as a light source, or using a cold-cathode tube (CCFL) is applicable.

The first optical device OD1 is disposed between the first insulating substrate 10 and the backlight BLT. The second optical device OD2 is disposed on the detection electrode DETE. The first optical device OD1 and the second optical device OD2 include at least a polarizer, and may include a retardation plate as necessary.

Next, a touch sensor used in the sensor-equipped display device DSP will be described. In the touch sensor, as a type of detecting a touch or a proximity of an external proximity object such as a user's finger or a pen on the touch panel, there are a mutual detection mode and a self detection mode.

<Mutual Detection Mode>

Figure 3A:
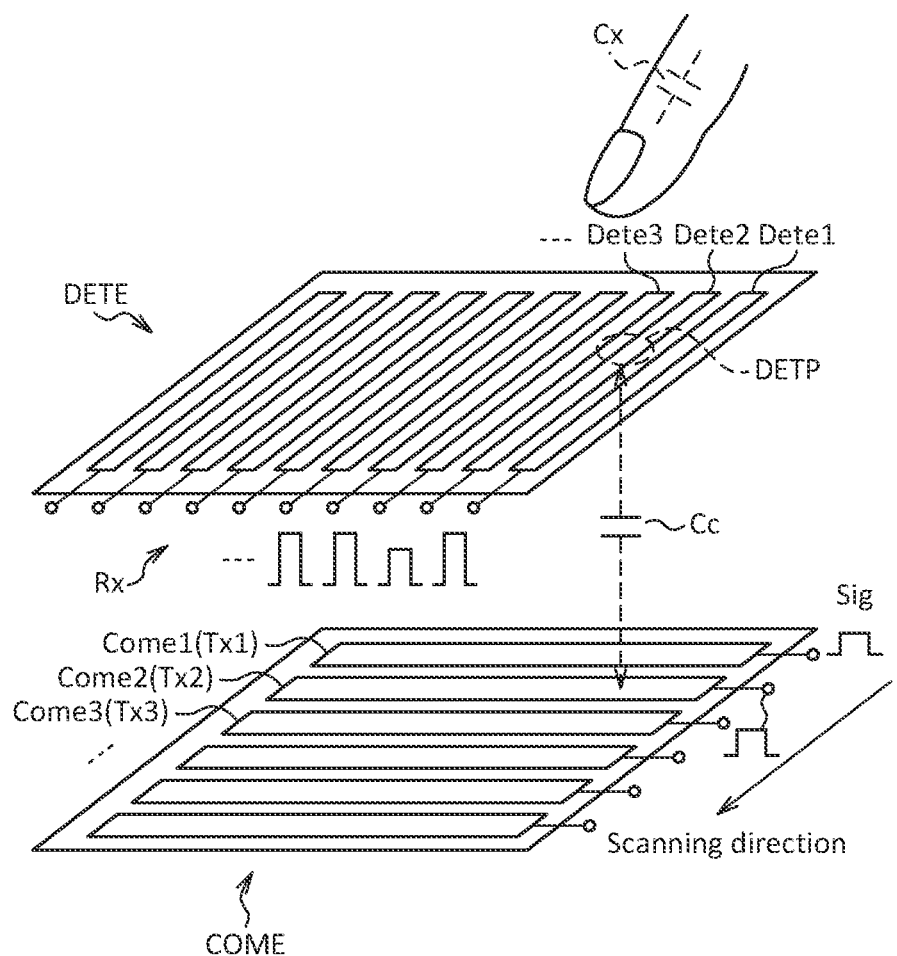
FIG. 3A is a view showing the representative basic configuration of a mutual detection mode of the sensor-equipped display device according to an embodiment.

FIG. 3A is a view showing the representative basic configuration of the mutual detection mode of the sensor-equipped display device according to the embodiment. As the sensor, the common electrode COME and the detection electrode DETE are used.

The common electrode COME includes the plurality of common electrodes Come (Come1, Come2, Come3, . . . ). The plurality of common electrodes Come are in stripes, for example. The plurality of common electrodes Come (Come1, Come2, Come3, . . . ) are arrayed in a scanning (driving) direction (the Y-direction or the X-direction).

On the other hand, the detection electrode DETE includes a plurality of detection electrodes Dete (Dete1, Dete2, Dete3, . . . ) (narrower than the common electrode). The plurality of detection electrodes Dete are in stripes, for example. The plurality of detection electrodes Dete (Dete1, Dete2, Dete3, . . . ) are arrayed in the direction orthogonal to or intersecting with the common electrode (Tx) (the X-direction or the Y-direction).

The common electrode COME and the detection electrode DETE are disposed with a gap therebetween. Therefore, between the plurality of common electrodes Come and the plurality of detection electrodes Dete, basically a capacitance Cc (Baseline capacitance) is present as electrostatic capacitance.

To the plurality of common electrodes Come, a predetermined voltage is applied mutually in an image display period (a display period), and in a touch detection period (a detection period), a drive pulse in a pulse shape (an alternating signal) is applied. For this reason, in the detection period, it can also be said that each of the plurality of common electrodes Come is the drive electrode (Tx). Since the plurality of detection electrodes Dete receive signals from the plurality of common electrodes Come, the plurality of detection electrodes Dete can also be written as Rx (Rx1, Rx2, Rx3, . . . ).

The plurality of common electrodes Come, i.e., the drive electrode Tx (Tx1, Tx2, Tx3, . . . ) in detection of a touch are scanned using a drive pulse (Sig) for a predetermined period. Now, the user's finger approaches the intersecting part of the detection electrode Rx2 with the drive electrode Tx2, and the user's finger is present at the intersecting part. At this time, the drive pulse (Sig) is supplied to the drive electrode Tx2, a waveform in a pulse shape is obtained on the detection electrode Rx (Rx1, Rx2, Rx3, . . . ), and from the detection electrode Rx2, a pulse is obtained, at the amplitude level which is lower than pulses obtained from the other detection electrodes. The detection electrode Rx (Rx1, Rx2, Rx3, . . . ) monitors a fringing field from the drive electrode Tx (Tx1, Tx2, Tx3, . . . ). When a conductive material like a finger approaches, the detection electrode Rx exerts the effect of shielding this fringing field. The fringing field is shielded, and thus the detection potential of the detection electrode Rx is reduced.

In mutual detection, this difference in the detection potential can be handled as the detection pulse of the position DETP. A capacitance Cx shown in the drawing is varied between the case where the user's finger is close to the detection electrode DETE and in the case where the user's finger is away from the detection electrode DETE. Therefore, the level of the detection pulse is also varied between the case where the user's finger is close to the detection electrode DETE and in the case where the user's finger is away from the detection electrode DETE. Accordingly, the degree of proximity of the finger to the flat surface of the touch panel can be determined by the amplitude level of the detection pulse. With the use of the electrode drive timing using a drive pulse Sig and the output timing of the detection pulse, it is possible to detect the two-dimensional position of the finger on the flat surface of the touch panel.

<Self Detection Mode>

Figure 3B:
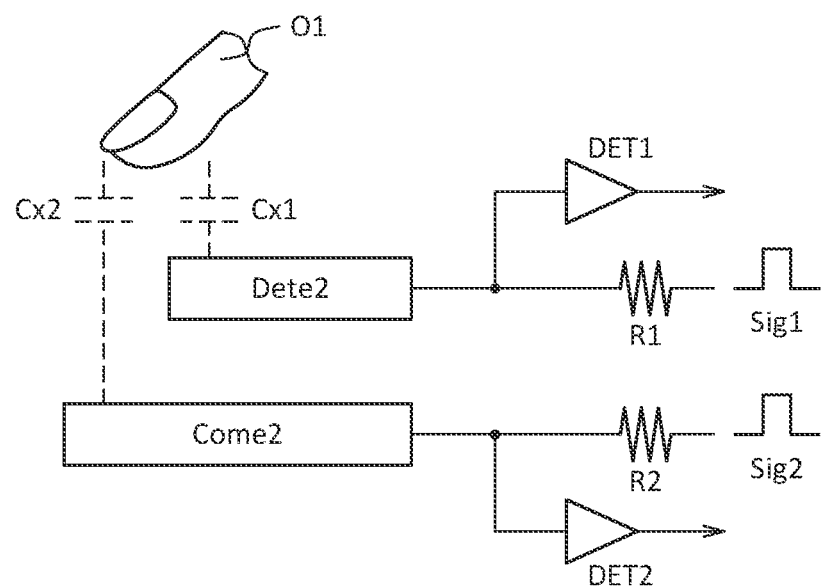
FIG. 3B is a view showing the representative basic configuration of a self detection mode according to the embodiment.

FIG. 3B is a view showing the representative basic configuration of the self detection mode according to the embodiment. In the self detection mode, a self detection drive pulse in a pulse shape is sequentially supplied to the plurality of detection electrodes Dete and the plurality of common electrodes Come, and the position or the coordinates of the user's finger that is an external proximity object is detected. FIG. 3B shows the detection electrode Dete2 and the common electrode Come2 as examples, and shows the case where a user's finger O1 approaches or is in contact at the intersection point part of the detection electrode Dete2 with the common electrode Come2. The user's finger O1 increases the electrostatic capacitance of the detection electrode Dete2 to a value in which the self capacitance of Dete2 and a capacitance Cx1 due to the user's finger O1 are added. Similarly, the electrostatic capacitance of the common electrode Come2 is increased to a value in which the self capacitance of the common electrode Come2 and a capacitance Cx2 due to the user's finger O1 are added. In this state, for example, first, the detection electrode Dete2 is driven by a self detection drive pulse Sig1 (an alternating signal) through a predetermined impedance R1, and the increased electrostatic capacitance of the detection electrode Dete2 is charged by the self detection drive pulse Sig1. A detection circuit DET1 detects that the user's finger O1 is present at the detection electrode Dete2 based on the value of the charging voltage increased due to the capacitance Cx1. Subsequently, the common electrode Come2 is driven by a self detection drive pulse Sig2 through a predetermined impedance R2, and the increased electrostatic capacitance of the common electrode Come2 (Tx2) is charged by the self detection drive pulse Sig2. A detection circuit DET2 detects that the user's finger O1 is present at the detection electrode Dete2 based on the value of the charging voltage increased due to the capacitance Cx2. Thus, it is detected that the user's finger O1 is present at the intersection point of the detection electrode Dete2 with the common electrode Come2, and the position or the coordinates of the user's finger O1 on the flat surface of the touch panel are detected.

Although not shown in FIG. 3B, similarly to FIG. 3A, as the sensor, the common electrode COME and the detection electrode DETE are used. Similarly to FIG. 3A, the plurality of common electrodes Come sequentially driven (scanned) by the self detection drive pulse Sig2 include the plurality of common electrodes (Come1, Come2, Come3, . . . ) in stripes. The plurality of common electrodes Come are arrayed in the Y-direction or in the X-direction. Similarly, the detection electrode DETE by the self detection drive pulse Sig1 includes the plurality of detection electrodes (Dete1, Dete2, Dete3, . . . ) in stripes (similarly to FIG. 3A, actually, these electrodes are narrower than the common electrodes in stripes). The plurality of detection electrodes Dete are arrayed in the direction orthogonal to or intersecting with the plurality of common electrodes Come (the X-direction or the Y-direction). The plurality of detection electrodes Dete and the plurality of common electrodes Come are both sequentially driven (scanned) in the self detection mode using the configuration as shown in FIG. 3B, making it possible to detect the position of the external proximity object O1 at the intersection point of the plurality of detection electrodes Dete with the plurality of common electrodes Come. Note that at the detection period in the self detection mode, both of the plurality of detection electrodes Dete and the plurality of common electrodes Come can be regarded as the detection electrode.

A configuration may be provided in which in such a self detection mode, when the touch sensor is in a low power consumption mode, the detection electrode DETE alone is driven by the self detection drive pulse Sig1, only the presence or absence of an external proximity object such as a finger is detected, and then detection is switched to mutual detection to detect the coordinates of the external proximity object. A configuration may be provided in which with no provision of the detection electrode DETE, the plurality of common electrodes Come are separately disposed in a matrix configuration in the row direction (the X-direction) and in the long-side direction (the Y-direction), and the coordinates of an external proximity object such as a finger is detected in the self detection mode using only the plurality of common electrodes Come.

Note that a configuration may be provided in which although not shown in FIGS. 3A and 3B, the mutual detection mode and the self detection mode are switchable using a switch, for example. The configuration of the self detection mode shown in FIG. 3B is an example, and configurations are not limited to the configuration.

Figure 4A:
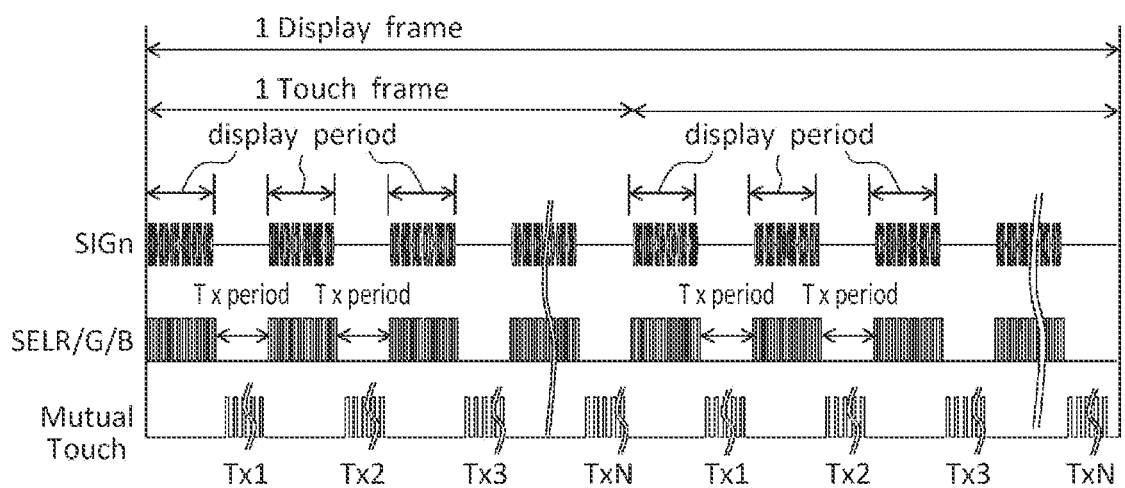
FIG. 4A is a view illustrating the driving method for the mutual detection mode of the sensor-equipped display device according to an embodiment.
Figure 4B:
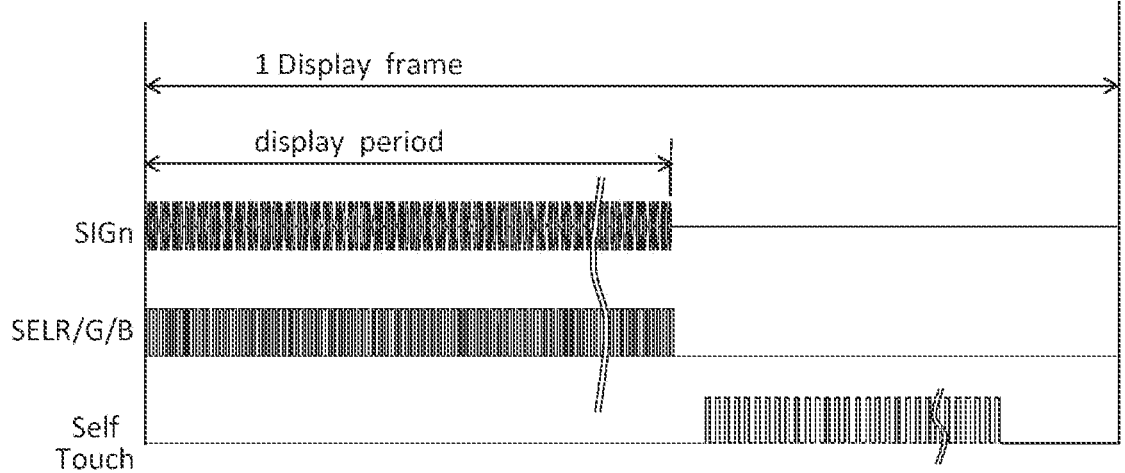
FIG. 4B is a view illustrating the driving method for the self detection mode of the sensor-equipped display device according to an embodiment.

FIGS. 4A and 4B are views illustrating driving methods for the mutual detection mode and the self detection mode of the sensor-equipped display device according to an embodiment. As described above, since the common electrode COME used for displaying images also double as a touch position detection electrode, the image displaying operation and the touch position detection operation are driven by time sharing.

In the mutual detection mode shown in FIG. 4A, a period in which an image is displayed and a period in which the touch position is detected are divided, and the divided image display period and the divided touch position detection period are alternately repeated to form one frame display period. That is, the operation in which an image signal (SIGn) for each color is outputted corresponding to signals (SELR/G/B) that select three colors, R, G, and B, is executed on a plurality of divided display rows, and then the mutual detection operation in which the drive pulse Sig is inputted to a plurality of divided drive electrodes Tx is executed. The operations are sequentially repeatedly executed on the plurality of divided display rows and the plurality of divided drive electrodes Tx. In this example, touch detection in two frames is performed in one frame display period. In the touch detection period in one frame, the drive electrodes Tx1, Tx2, Tx3, . . . are sequentially scanned by the drive pulse Sig, and the touch position is detected.

In the self detection mode shown in FIG. 4B, images in one frame are displayed, the self detection drive pulse (Sig1) is inputted to all the detection electrodes DETE, and then the self detection operation is executed. That is, after the operation in which the image signal (SIGn) for each color is outputted corresponding to the signals (SELR/G/B) that select three colors, R, G, and B, for all the display rows, the self detection drive pulse (Sig1) is inputted for all the detection electrodes DETE, and then the self detection operation is executed. Note that a configuration may be provided in which all the detection electrodes DETE (Rx) are scanned by the self detection drive pulse (Sig1), all the common electrodes COME (Tx) are scanned by the self detection drive pulse (Sig2), and then the self detection operation is executed. The reason why the sensing operation is collectively performed instead of dividing in the self detection mode is that sensing data is acquired to enable the improvement of the sensitivity of sensing. Note that the self detection mode is a mode in which sensing is enabled at higher sensitivity than in the mutual detection mode. Self sensing may be performed in the detection period shown in FIG. 4A (sharing method), not limited to the mode shown in FIG. 4B.

Next, referring to the drawings, the schematic configuration of the sensor according to the embodiment will be described. Note that in the following description, the plurality of common electrodes Come 1, Come2, Come3, . . . are shown with the symbols of the drive electrodes Tx1, Tx2, Tx3, . . . The plurality of detection electrodes Dete1, Dete2, Dete3, . . . are shown with the symbols of Rx1, Rx2, Rx3, . . . For easy understanding and for easy showing the drawings, the drive electrode (Tx1, Tx2, and so on) is depicted by dotted lines, and the detection electrode (Rx1, Rx2, and so on) is depicted by solid lines. The lead wire (W11, W12, and so on) is depicted by thin solid lines.

Figure 5:
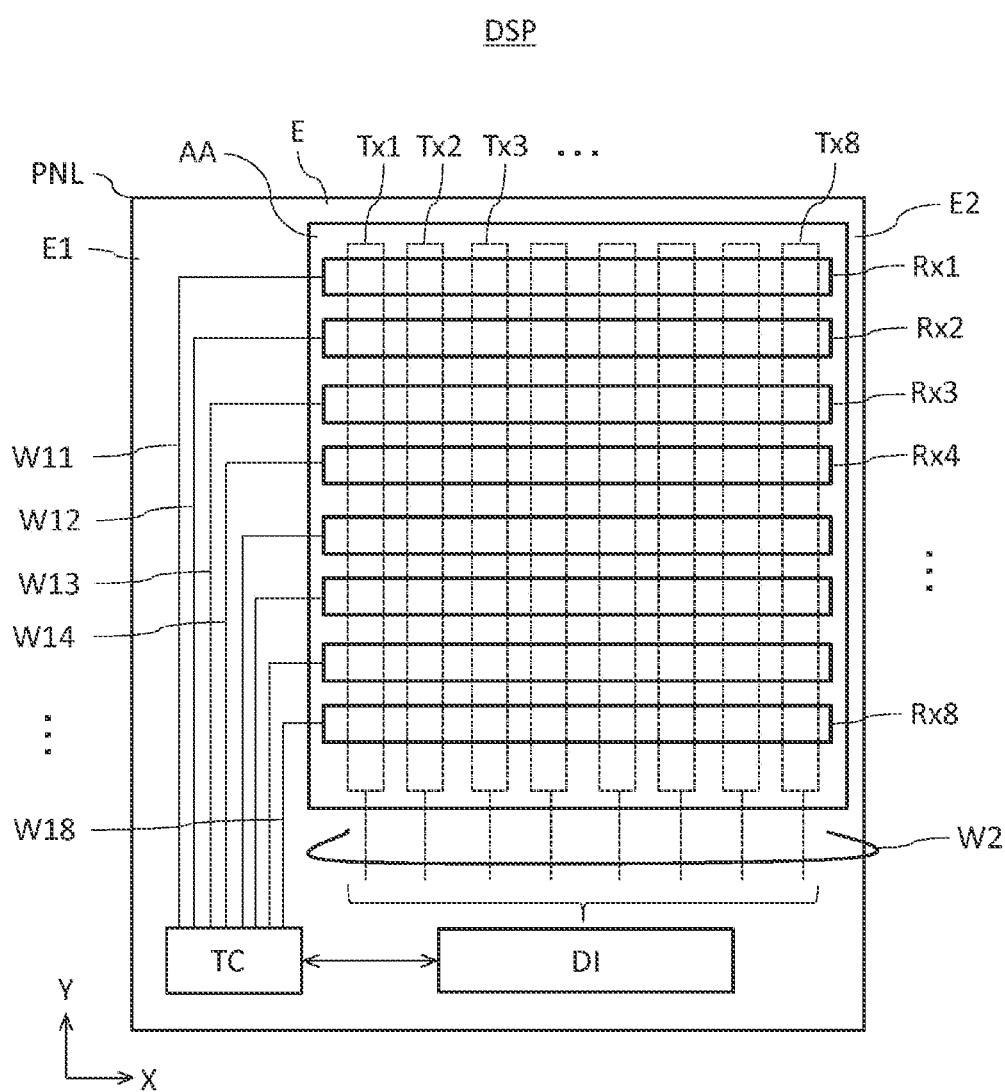
FIG. 5 is a conceptual plan view showing an exemplary configuration of the sensor of the sensor-equipped display device according to an embodiment.

FIG. 5 is a conceptual plan view showing an exemplary configuration of the sensor of the sensor-equipped display device according to the embodiment. The sensor-equipped display device DSP has the display panel PNL including an active region (touch detection region) AA of the sensor and a peripheral region (frame region) E provided around the active region. The active region (the touch detection region) AA of the sensor can be regarded as the region almost the same as the display region of the display panel PNL. In the drawing, the display panel PNL has a first side (left-hand side), a second side (right-hand side) opposite to the first side, a third side (upper side) provided between the first side and the second side, and a fourth side (lower side) opposite to the third side. In the peripheral region (the frame region) E around the active region (the touch detection region) AA of the sensor, a frame region E1 on the left side and a frame region E2 on the right side are shown as examples.

As shown in examples, in the active region AA of the sensor, a plurality of drive electrodes Tx1, Tx2, Tx3, . . . , and Tx8 are provided in parallel in the Y-direction, and a plurality of detection electrodes Rx1, Rx2, Rx3, . . . , and Rx8 are provided in parallel with the X-direction intersecting with the Y-direction.

In FIG. 5, in the frame region E1 on the left side, a plurality of lead wires W11, W12, W13, W14, . . . , and W18 coupled, respectively, to the plurality of detection electrodes Rx1, Rx2, Rx3, . . . , and Rx8 are provided. The plurality of lead wires W11, W12, W13, W14, . . . , and W18 are electrically connected to a touch detection circuit (touch controller, control circuit) TC.

The plurality of drive electrodes Tx1, Tx2, Tx3, . . . , Tx8 are electrically connected to a display controller DI through a plurality of lead wires W2 and a common electrode driver circuit CD (not shown), and in the detection period of the touch sensor, the plurality of drive electrodes Tx1, Tx2, Tx3, . . . , Tx8 are sequentially driven using a drive pulse Sig from the common electrode driver circuit CD in response to an instruction from the display controller DI. Note that a touch detection circuit TC may be provided in the display controller DI.

Figure 6:
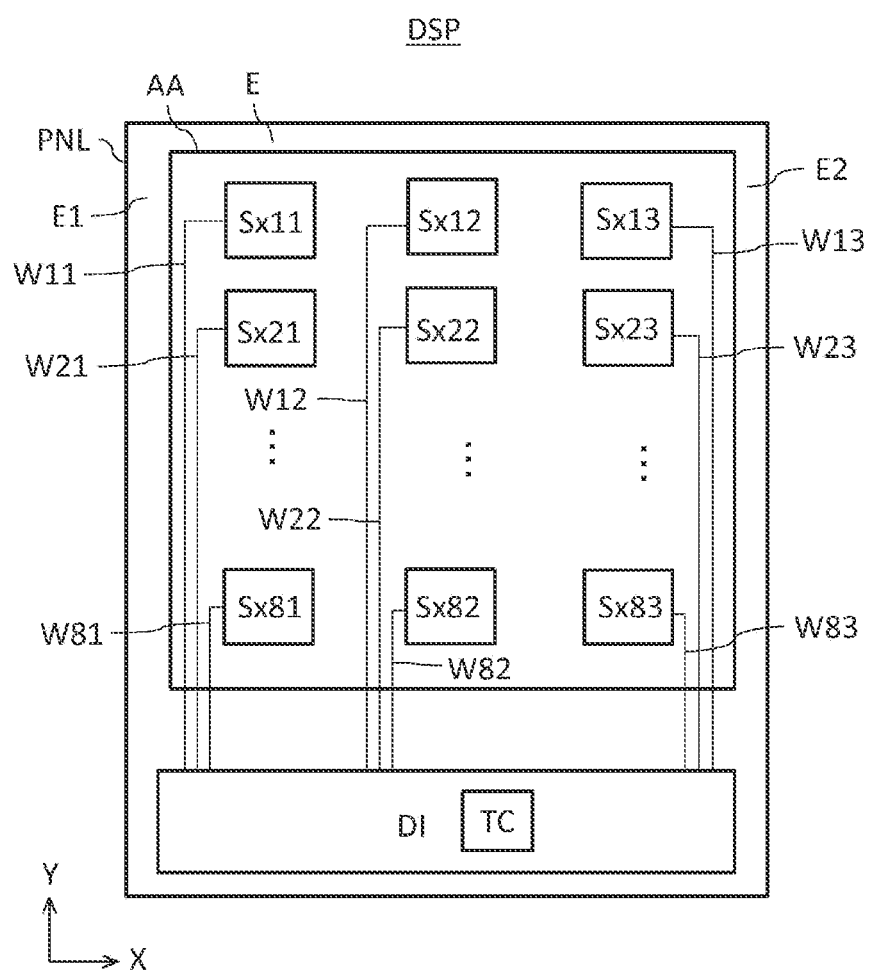
FIG. 6 is a conceptual plan view showing another exemplary configuration of the sensor of the sensor-equipped display device according to an embodiment.

FIG. 6 is a conceptual plan view showing another exemplary configuration of the sensor of the sensor-equipped display device according to the embodiment.

FIG. 6 shows a sensor-equipped display device DSP usable for the self detection mode, and sensor electrodes Sx (Sx11, Sx12, Sx13, Sx21, Sx22, Sx23, . . . , Sx81, Sx82, and Sx83) are formed as separate electrodes disposed on the active region (the touch detection region) AA of the sensor in a matrix configuration (in a matrix configuration). The sensor electrode Sx (Sx11 to Sx83) has a function as the display common electrode COME in the image display period, and has a function as the drive electrode and the detection electrode in the detection period of the touch sensor. In the following, the sensor electrode Sx (Sx11 to Sx83) will be described as the detection electrode.

As opposite to the detection electrodes Sx11 to Sx83, a plurality of pixels PX are formed. The detection electrodes Sx11 to Sx83 are electrically connected to the display controller DI through the plurality of lead wires W11, W12, W13, W21, W22, W23, . . . , W81, W82, and W83. In the detection period of the touch sensor, the detection electrodes Sx11 to Sx83 are sequentially driven using the drive pulse from the common electrode driver circuit CD in response to an instruction from the display controller DI. The detection signals from the separate electrodes of the detection electrodes Sx11 to Sx83 are supplied to the touch detection circuit TC provided in the display controller DI through the lead wires W11, W12, W13, W21, W22, W23, . . . , W81, W82, and W83, and the touch position can be immediately located. On the other hand, the detection electrodes Sx11 to Sx83 function as the common electrode COME in the image display period, to which a predetermined voltage (VCOM) is applied.

Figure 7:
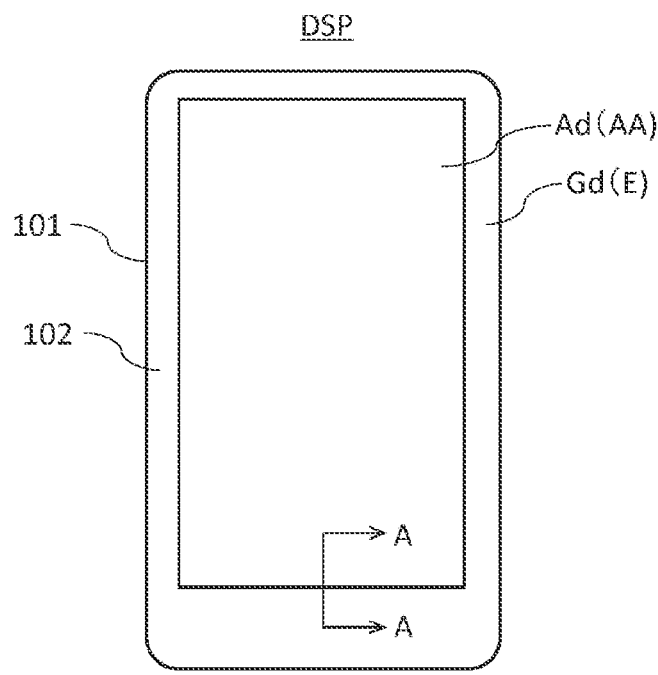
FIG. 7 is a plan view of the sensor-equipped display device according to an embodiment.

FIG. 7 is a plan view of the sensor-equipped display device according to the embodiment. The sensor-equipped display device DSP has a display region Ad in which images are displayed, and a frame region Gd provided on the outer side of the display region Ad. The display region Ad can be regarded as almost the same region as the active region AA of the sensor shown in FIGS. 5 and 6. The frame region Gd can be regarded as almost the same region as the frame region E shown in FIGS. 5 and 6. The top surface part of the sensor-equipped display device DSP is covered with a cover member 101. The cover member 101 is formed of a transparent member (having translucency) such as glass. The cover member 101 is a translucent cover member, and can be said as a cover glass, for example. In the cover member 101, in the region of the under surface of the cover member 101 corresponding to the frame region Gd, a decorative layer 102 is provided. The decorative layer 102 is a color layer having a light transmittance smaller than the light transmittance of the cover member 101, and enables the suppression of visual recognition of wirings or circuits, for example, provided being superposed on the frame region Gd by an observer. In other words, the decorative layer 102 has a light shielding property. The decorative layer 102 is not limited to s single layer, and may have a configuration in which a plurality of layers are layered.

In the following description, the sensor-equipped display device DSP in the self detection mode shown in FIG. 6 will be chiefly described as a representative example. However, the embodiment is also applicable to the sensor-equipped display device DSP in the mutual detection mode.

Figure 8:
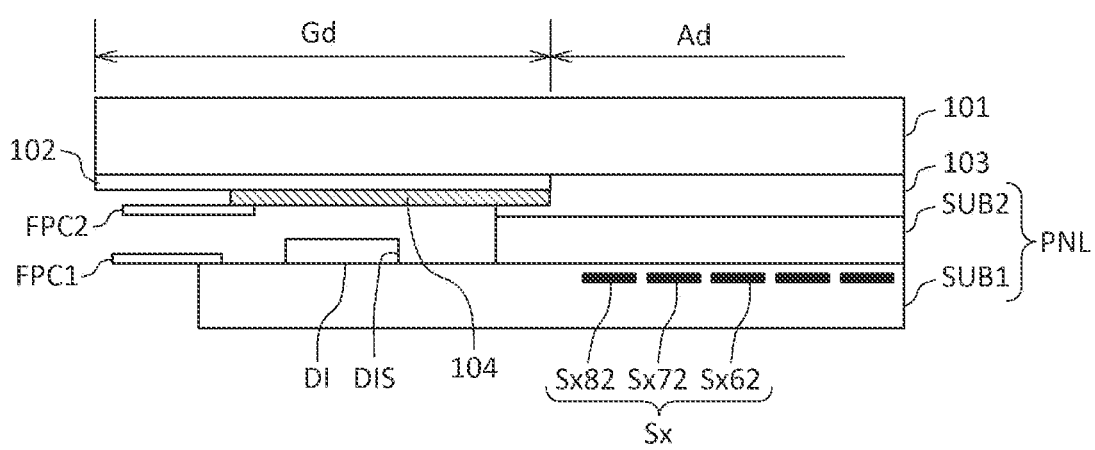
FIG. 8 is a cross sectional view of the sensor-equipped display device taken along line A-A in FIG. 7.
Figure 9:
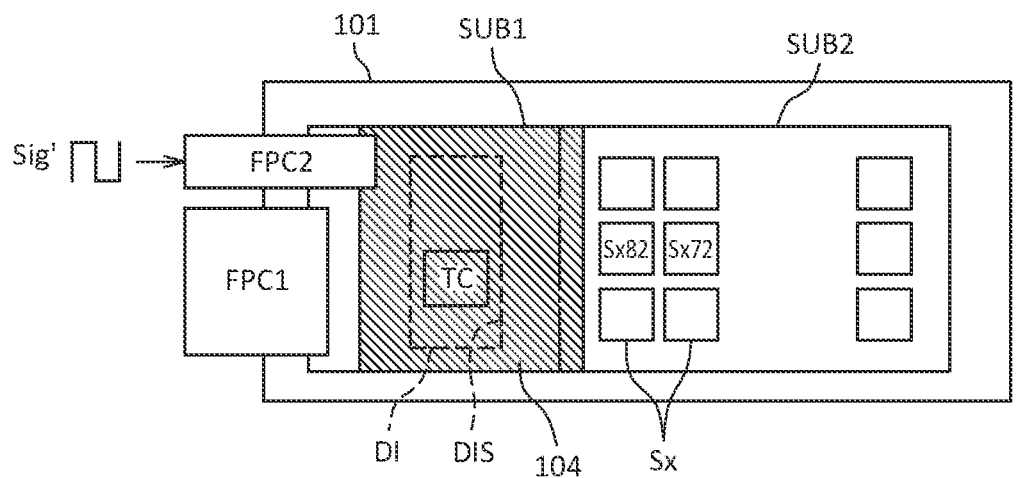
FIG. 9 is a conceptual plan view of the sensor-equipped display device in FIG. 8.

FIG. 8 is a cross sectional view of the sensor-equipped display device taken along line A-A in FIG. 7. FIG. 9 is a conceptual plan view of the sensor-equipped display device in FIG. 8.

As shown in FIG. 8, the sensor-equipped display device DSP has the display panel PNL including the array substrate SUB1 and the counter substrate SUB2, the cover member 101, and an adhesive layer 103 that adheres the cover member 101 to the counter substrate SUB2. At the end portion of the array substrate SUB1, the display controller DI including the touch detection circuit TC is provided. The display controller DI is a semiconductor device, and a front surface (the surface on which elements of the semiconductor device, wirings, connection terminal, and the like are formed) that is the element forming region of the display controller DI is provided opposite to the array substrate SUB1. To the back surface of the display controller DI, a ground potential is supplied, and the back surface is provided opposite to the cover member 101. A plurality of electrodes (connection terminals and the like) formed on the front surface of the display controller DI are electrically connected to a plurality of electrodes (connection terminals and the like) of the array substrate SUB1. Some of the electrodes of the plurality of electrodes formed on the front surface of the display controller DI are electrically connected to a plurality of wirings provided on a flexible circuit board FPC1 through some of the plurality of electrodes of the array substrate SUB1. On the region of the array substrate SUB1 corresponding to the display region Ad (the active region AA), a plurality of detection electrodes Sx (Sx82, Sx72, and Sx62) shown in FIG. 6 are formed. It can be said that the plurality of detection electrodes Sx (Sx82, Sx72, and Sx62) are used as the common electrodes that generate an electric field to control the orientation of a liquid crystal with the pixel electrode in the display period in which display is performed, whereas in the case where touch detection is performed by the self detection mode in the touch detection period, the plurality of detection electrodes Sx are the drive electrode since the drive signal to perform self detection is supplied. Note that in FIG. 8, the liquid crystal layer LQ provided between the first substrate SUB1 and the second substrate SUB2 is omitted for simplifying the drawing.

As shown in FIG. 8, on the under surface of the cover member 101 corresponding to the frame region Gd, the decorative layer 102 is formed. On the under surface of the decorative layer 102, a conductive layer 104 is formed so as to cover the display controller DI. As shown in FIG. 9, the conductive layer 104 is provided so as to cover the display controller DI in a planar view. The conductive layer 104 can be formed of a transparent electrode formed of a transparent conductive material such as ITO or a metal electrode formed of a metal material. To the conductive layer 104, a flexible circuit board FPC2 is connected, and a drive pulse (Sig') in phase with (simultaneously) the self detection drive pulse Sig supplied to the plurality of detection electrodes Sx (Sx82, Sx72, and Sx62) is supplied. Note that the drive pulse (Sig') desirably has its amplitude substantially equivalent to the self detection drive pulse Sig supplied to the plurality of detection electrodes Sx (Sx82, Sx72, and Sx62). The conductive layer 104 is directly drive by the flexible circuit board FPC2. For example, the flexible circuit board FPC2 can be configured in which the flexible circuit board FPC2 is connected to the touch detection circuit TC provided on the display controller DI and the touch detection circuit TC supplies the drive pulse (Sig') in phase with the self detection drive pulse Sig. Accordingly, the conductive layer 104 can be driven by the same amplitude in phase with the plurality of detection electrodes Sx. Note that the conductive layer 104 is provided so as to entirely cover the side DIS of the display controller DI opposite to the display region Ad of the display panel PNL in a planar view. It can also be said that at least a part of the conductive layer 104 overlaps with at least a part of the display controller DI.

Figure 10:
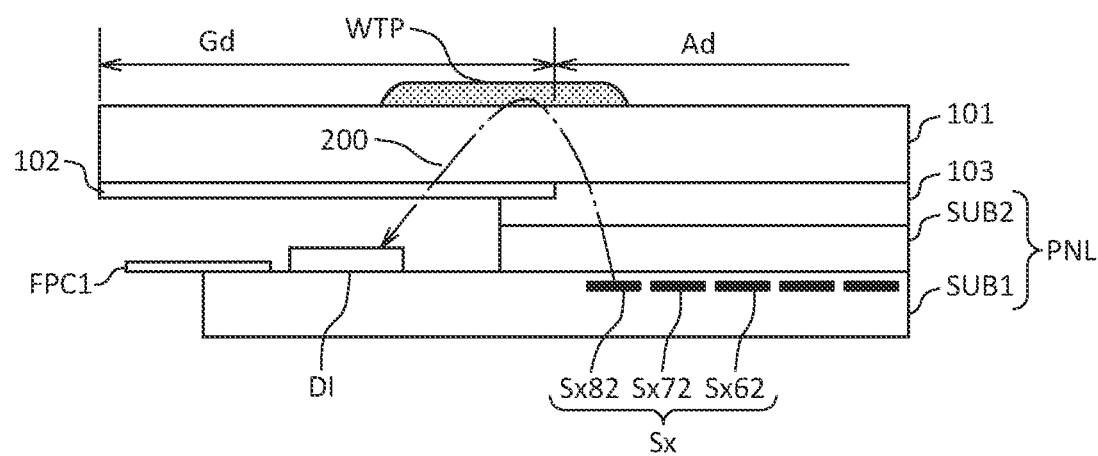
FIG. 10 is a cross sectional view of a sensor-equipped display device according to a comparative example.
Figure 11:
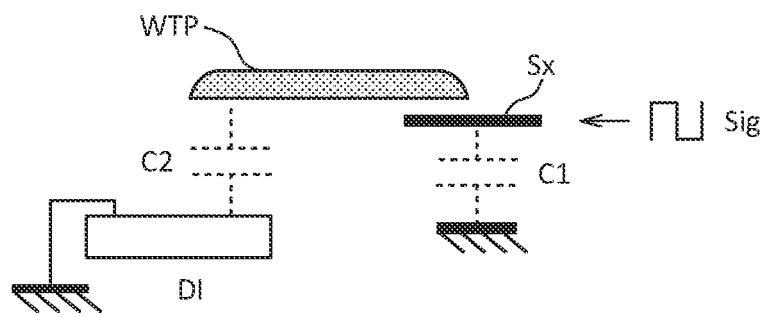
FIG. 11 is an equivalent circuit illustrating the influence of a water droplet over the sensor-equipped display device according to the comparative example.

FIG. 10 is a cross sectional view of the sensor-equipped display device according to a comparative example. FIG. 11 is an equivalent circuit illustrating the influence of a water droplet over the sensor-equipped display device according to the comparative example. Similarly to FIG. 8, FIG. 10 corresponds to a cross sectional view taken along line A-A in FIG. 7. FIG. 10 is different from FIG. 8 in that in FIG. 10, the conductive layer 104 and the flexible circuit board FPC2 are not provided. The other configurations are the same as FIG. 8, and the description is omitted.

As shown in FIG. 10, when a water droplet WTP is attached to a neighboring area across the WFP detection electrode Sx82 and the display controller DI on the top surface of the cover member 101, an electrical passage 200 is sometimes formed between the detection electrode Sx82 and the back surface of the display controller DI. In this case, in the period of the touch detection operation, the case arises in which the touch panel malfunctions to form a ghost, and it has not always been possible to obtain a correct touch detection output.

In other words, as shown in FIG. 11, when the water droplet WTP is present, a state is produced in which a capacitance value C1 between the detection electrode Sx and the ground potential and a capacitance C2 between the water droplet WTP and the ground potential on the back surface of the display controller DI are connected to each other in parallel, and this seemingly causes an increase in the capacitance value of the detection electrode Sx. In this state, when the self detection drive pulse Sig is applied to the detection electrode Sx in the period of the touch detection operation, a detection voltage Vdet is detected as Vdet=V1+a (a is the amount of influence of the capacitance C2 due to the water droplet WTP). On the other hand, in a state in which the water droplet WTP is absent, in the case where an external proximity object such as a finger or a pen approaches the detection electrode Sx, the detection voltage Vdet is normally detected as Vdet=V1+b (+b is the amount of influence of the capacitance due to the external proximity object such as a finger or a pen). At this time, if the amount of influence of the capacitance due to the external proximity object such as a finger or a pen is close to the amount of influence of the capacitance C2 due to the water droplet WTP, the water droplet WTP is sometimes falsely determined as an external proximity object such as a finger to a pen. Note that in the mutual detection mode the detection voltage is Vdet=V1-a, Vdet=V1-b (-a is the amount of influence of the capacitance C2 due to the water droplet WTP, and -b is the amount of influence of the capacitance due to the external proximity object such as a finger or a pen).

Figure 12:
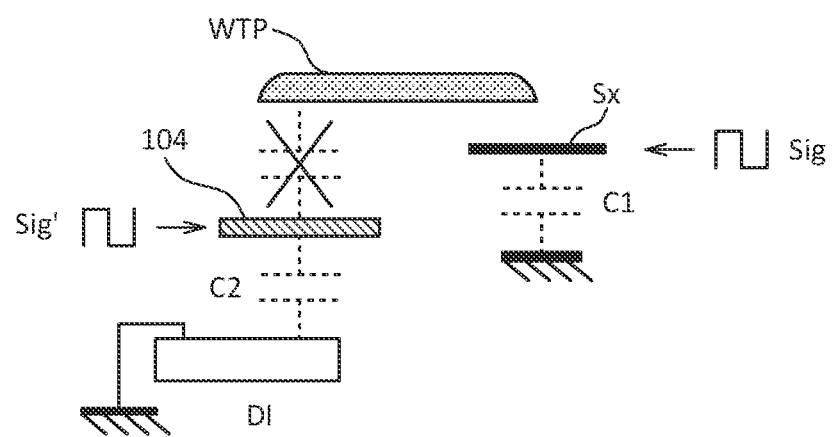
FIG. 12 is an equivalent circuit of the sensor-equipped display device in FIG. 8.

FIG. 12 is an equivalent circuit of the sensor-equipped display device in FIG. 8. In this example, between the water droplet WTP and the ground potential on the back surface of the display controller DI, the conductive layer 104 is present to which the drive pulse Sig' in phase with the self detection drive pulse Sig supplied to the detection electrode Sx is applied. In other words, the detection electrode Sx and the conductive layer 104 have the same potential, and this enables the suppression of the capacitance between the detection electrode Sx and the back surface of the display controller DI. Accordingly, even though the water droplet WTP is attached to the neighboring area across the detection electrode Sx82 and the display controller DI, in the period of the touch detection operation, the malfunction of the touch panel is prevented, the formation of a ghost is prevented, and a correct touch detection output can be obtained.

(Exemplary Modification 1)

Figure 13:
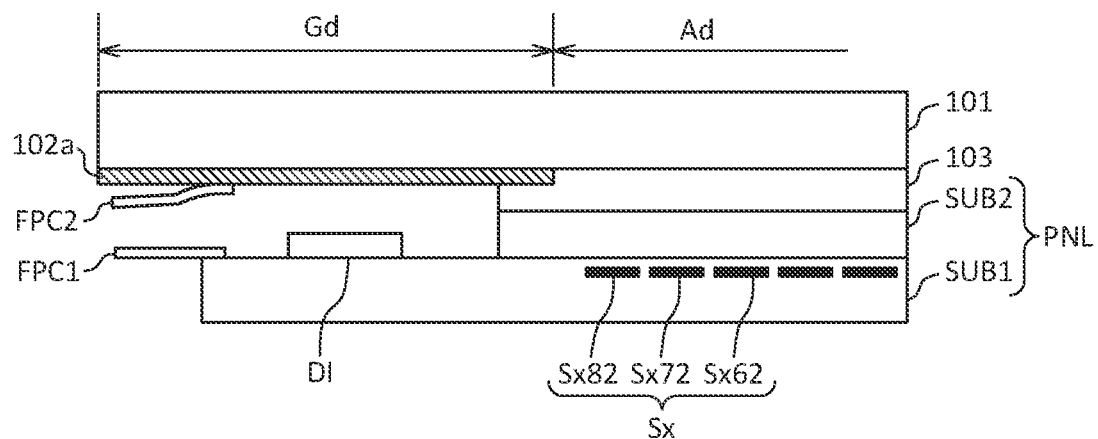
FIG. 13 is a cross sectional view of a sensor-equipped display device according to Exemplary Modification 1.

FIG. 13 is a cross sectional view of a sensor-equipped display device according to Exemplary Modification 1. FIG. 13 is different from FIG. 8 in that in FIG. 13, the configuration of the decorative layer 102a is changed to a configuration including a conductive material.

With this change, the flexible circuit board FPC2 is connected to the decorative layer 102a. In other words, the decorative layer 102a including a conductive material functions as a conductive layer equivalent to the conductive layer 104 in FIG. 8. The other configurations are the same as FIG. 8, and the description is omitted.

(Exemplary Modification 2)

Figure 14:
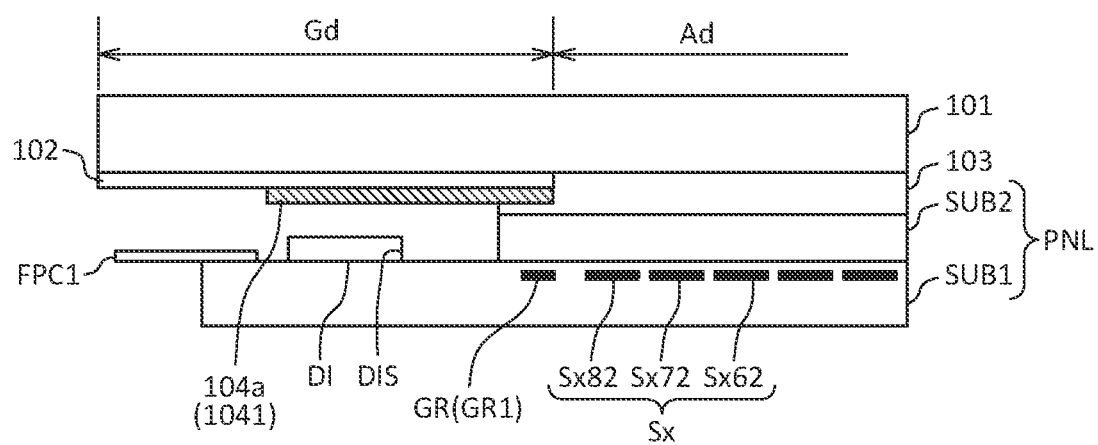
FIG. 14 is a cross sectional view of a sensor-equipped display device according to Exemplary Modification 2.
Figure 15:
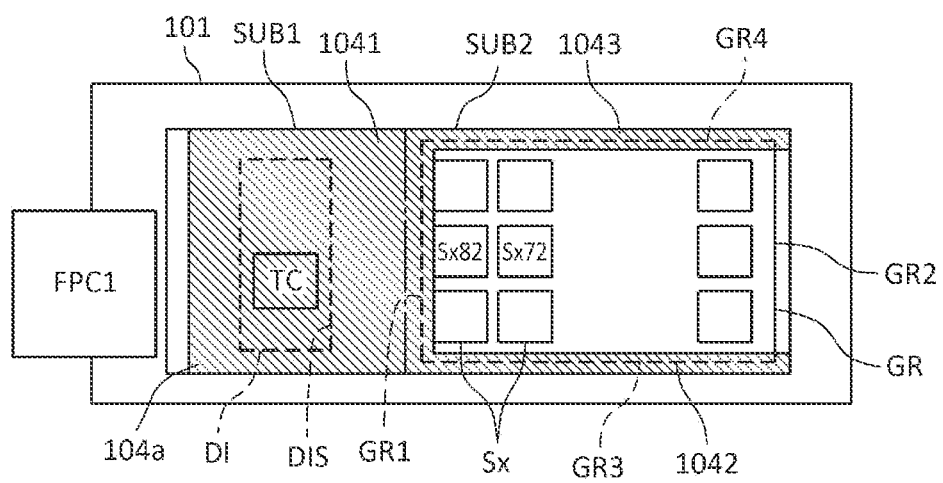
FIG. 15 is a conceptual plan view of the sensor-equipped display device according to Exemplary Modification 2.
Figure 16:
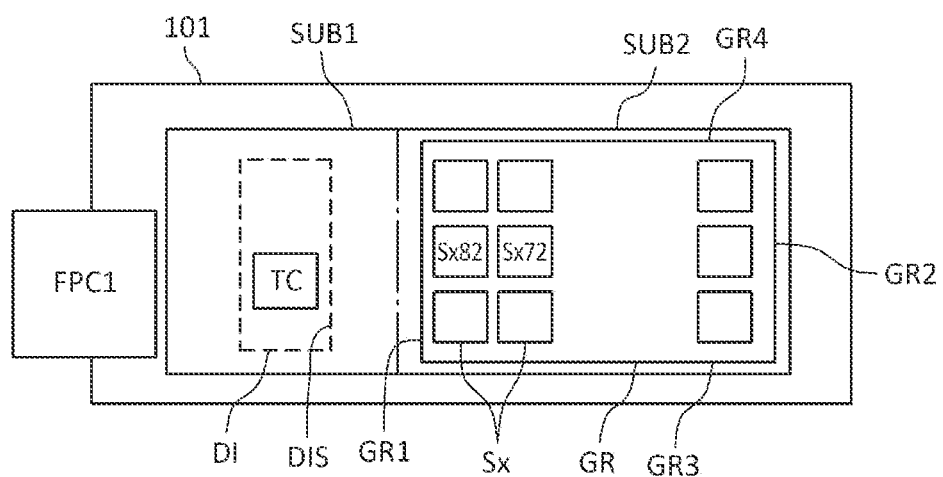
FIG. 16 is a conceptual plan view of the sensor-equipped display device in a state in which the conductive layer is removed from FIG. 15.

Referring to FIGS. 14 to 17, Exemplary Modification 2 will be described. In a sensor-equipped display device according to Exemplary Modification 2, a guard ring GR as a shield electrode is provided on the array substrate SUB1 such that the outer circumference of the plurality of detection electrodes Sx is surrounded. A conductive layer (104a) is then electrically coupled to the guard ring GR through a coupling capacitance, and thus the guard ring GR is driven to drive the conductive layer (104a) using the drive pulse in phase with the detection electrode Sx. Note that the conductive layer (104a) is desirably driven using the drive pulse at the same voltage in phase the detection electrode Sx. FIG. 14 is a cross sectional view of the sensor-equipped display device according to Exemplary Modification 2. FIG. 15 is a conceptual plan view of the sensor-equipped display device according to Exemplary Modification 2. FIG. 16 is a conceptual plan view of the sensor-equipped display device in the state in which the conductive layer is removed from FIG. 15.

FIG. 14 is different from FIG. 8 in that in FIG. 14, the flexible circuit board FPC2 is not connected to the conductive layer 104a and the guard ring GR (GR1) is provided on the array substrate SUB1. The guard ring (the shield electrode) GR may be provided in a wiring layer the same as the layer of the plurality of detection electrodes Sx, or may be provided in a different layer. As shown in FIG. 16, the guard ring GR is provided so as to surround the outer circumference of the plurality of detection electrodes Sx. In other words, the guard ring GR is provided in the frame region E provided so as to surround the active region (the touch detection region) AA of the sensor of the display panel PNL shown in FIG. 6. The guard ring GR has a first side GR1 provided opposite to the display controller DI, a second side GR2 opposite to the first side GR1, a third side GR3 provided between the first side GR1 and the second side GR2, and a fourth side GR4 opposite to the third side GR3, and the guard ring GR is driven by a control unit provided on the display controller DI or the array substrate SUB1.

As shown in FIG. 15, the conductive layer 104a includes first region 1041 provided so as to cover the display controller DI to the first side GR1, a second region 1042 provided so as to cover the third side GR3, and a third region 1043 provided so as to cover the fourth side GR4. The conductive layer 104a may be configured including a region provided so as to cover the second side GR2. The first region 1041, the second region 1042, and the third region 1043 of the conductive layer 104a are provided overlapping with the first side GR1, the third side GR3, and the fourth side GR4 of the guard ring GR. Accordingly, the first region 1041, the second region 1042, and the third region 1043 of the conductive layer 104a are electrically coupled to the first side GR1, the third side GR3, and the fourth side GR4 of the guard ring GR through a coupling capacitance. The first region 1041 of the conductive layer 104a is provided so as to entirely cover the side DIS of the display controller DI opposite to the display region Ad of the display panel PNL in a planar view.

The guard ring GR is driven using a drive pulse Sig" in phase with the drive pulse Sig applied to the detection electrode Sx. Thus, it is possible to suppress the capacitance between the detection electrode Sx and the frame region of the display panel PNL.

Figure 17:
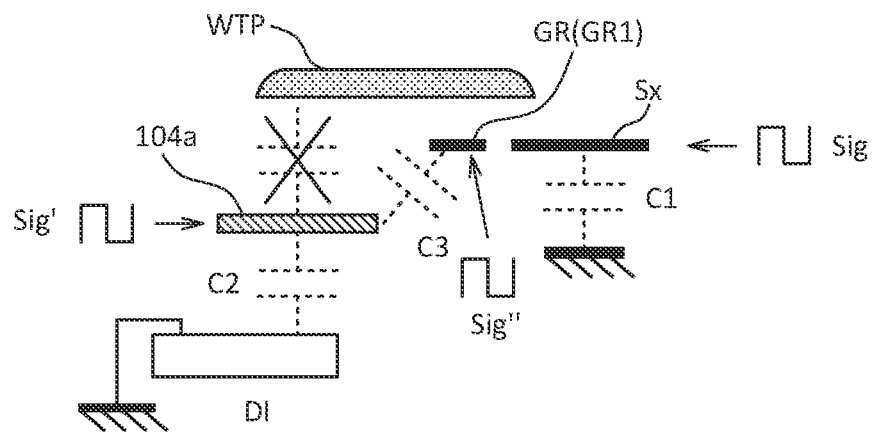
FIG. 17 is an equivalent circuit of the sensor-equipped display device according to Exemplary Modification 2.

FIG. 17 is an equivalent circuit of the sensor-equipped display device according to Exemplary Modification 2. FIG. 17 is different from FIG. 12 in that in FIG. 17, the guard ring GR (GR1) is provided between the detection electrode Sx and the conductive layer 104a. Between the guard ring GR and the conductive layer 104a, a coupling capacitance C3 is present. The guard ring GR (GR1) is driven using the drive pulse Sig" in phase with the drive pulse Sig applied to the detection electrode Sx. The conductive layer 104a is driven using the drive pulse Sig' in phase with the drive pulse Sig" due to the coupling capacitance C3. Note that preferably, the capacitance value of the coupling capacitance C3 between the conductive layer 104a and the guard ring GR is set to a value (C3>C2) larger than the capacitance value of the capacitance C2 between the conductive layer 104a and the back surface of the display controller DI. In other words, desirably, the conductive layer 104a is disposed such that the relationship C3>C2 is held. Desirably, the amplitude of the guard ring GR and the values of the capacitances C2 and C3 are set such that the amplitude of the conductive layer 104a is substantially equivalent to the amplitude of the detection electrode Sx. The amplitude of the guard ring GR may be substantially equivalent to the amplitude of the detection electrode Sx.

According to Exemplary Modification 2, electrical coupling between the guard ring GR and the conductive layer 104a is used, and the conductive layer 104a is driven in phase with the detection electrode Sx, and thus it is possible to suppress the capacitances of the detection electrode Sx and the display controller DI. For this reason, even though the water droplet WTP is attached to the neighboring area across the detection electrode Sx82 and the display controller DI, in the period of the touch detection operation, the malfunction of the touch panel is prevented, and a correct touch detection output can be obtained.

Exemplary Modification 3

Figure 18:
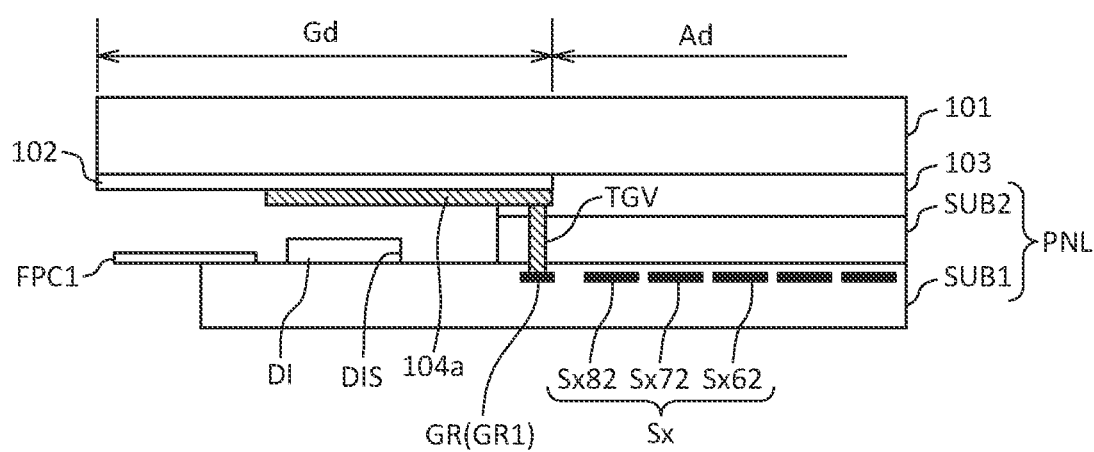
FIG. 18 is a cross sectional view of a sensor-equipped display device according to Exemplary Modification 3.

Exemplary Modification 2 has the configuration in which the conductive layer 104a is electrically coupled to the guard ring GR through the coupling capacitance. However, the configuration is not limited to this. In Exemplary Modification 3, a configuration will be described in which the conductive layer 104a is electrically connected to the guard ring GR through a via electrode (TGV). FIG. 18 is a cross sectional view of a sensor-equipped display device according to Exemplary Modification 3.

FIG. 18 is different from FIG. 14 in that the via electrode TGV is provided, the via electrode TGV connecting the conductive layer 104a to the guard ring GR (GR1). The via electrode TGV can be configured in which a metal material is buried in a through hole provided in the array substrate SUB1, the counter substrate SUB2, and the adhesive layer 103. The other configurations are the same as the configurations in FIG. 12.

(Exemplary Modification 4)

Figure 19:
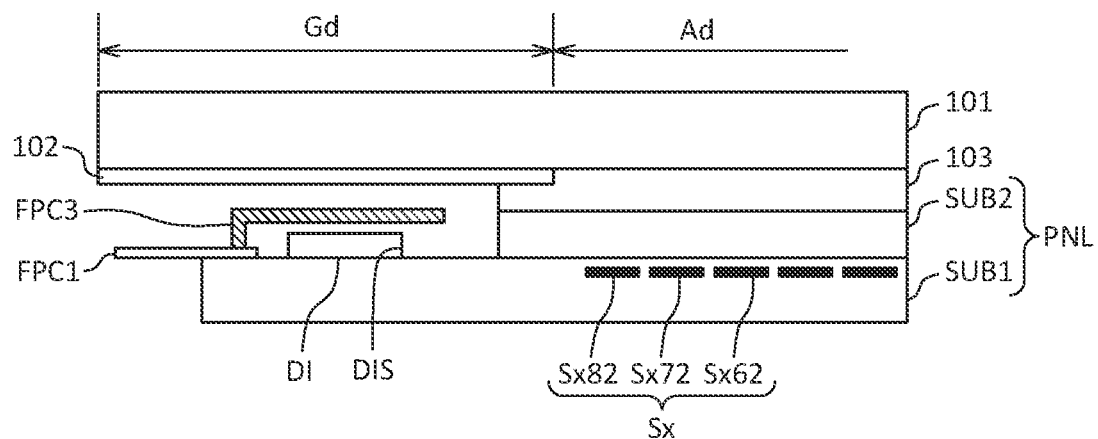
FIG. 19 is a cross sectional view of a sensor-equipped display device in a first configuration according to Exemplary Modification 4.
Figure 20:
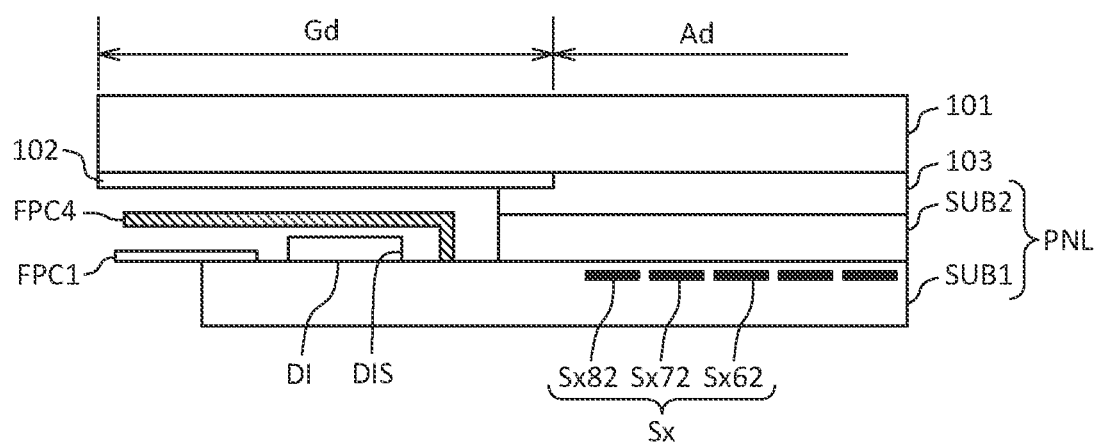
FIG. 20 is a cross sectional view of a sensor-equipped display device in a second configuration according to Exemplary Modification 4.

In the embodiment and Exemplary Modifications 1 to 3, the configuration using the conductive layer (104, 104a) provided in the cover member 101 and the decorative layer 102a including a conductive material is described. However, the configuration is not limited to this. A configuration may be provided in which between the cover member 101 and the back surface of the display controller DI, a component like a flexible circuit board having a conductive layer driven using a drive pulse in phase with the drive pulse Sig applied to the detection electrode Sx is provided instead of the conductive layer (104, 104a) or the decorative layer 102a including a conductive material. FIG. 19 is a cross sectional view of a sensor-equipped display device in a first configuration according to Exemplary Modification 4. FIG. 20 is a cross sectional view of a sensor-equipped display device in a second configuration according to Exemplary Modification 4.

In FIG. 19, a flexible circuit board FPC3 is provided as a component between the decorative layer 102 of the cover member 101 and the back surface of the display controller DI. The flexible circuit board FPC3 has a conductive layer driven using a drive pulse in phase with the drive pulse Sig applied to the detection electrode Sx. Similarly to the conductive layer 104 in FIG. 9, the conductive layer on the flexible circuit board FPC3 is provided so as to cover the display controller DI in a planar view. One end of the flexible circuit board FPC3 is electrically connected to the flexible circuit board FPC1, for example, and the conductive layer on the flexible circuit board FPC3 is electrically connected to the touch detection circuit TC provided on the display controller DI through the flexible circuit board FPC1. For this reason, the conductive layer on the flexible circuit board FPC3 can be driven using the drive pulse in phase with the self detection drive pulse Sig using the touch detection circuit TC. Note that desirably, the conductive layer on the flexible circuit board FPC3 is driven using the drive pulse substantially at the same amplitude in phase with the self detection drive pulse Sig.

In FIG. 20, between the decorative layer 102 of the cover member 101 and the back surface of the display controller DI, a flexible circuit board FPC4 as a component is provided. One end of the flexible circuit board FPC4 is connected to the front surface of the array substrate SUB1 between the display controller DI and the counter substrate SUB2. The conductive layer on the flexible circuit board FPC4 is driven using a drive pulse in phase with the drive pulse Sig applied to the detection electrode Sx. Similarly to the conductive layer 104 in FIG. 9, the conductive layer on the flexible circuit board FPC4 is provided so as to cover the display controller DI in a planar view. The other end of the flexible circuit board FPC4 is electrically connected to the flexible circuit board FPC1, for example, and is electrically connected to the touch detection circuit TC provided on the display controller DI. Thus, the flexible circuit board FPC4 can be driven using the drive pulse in phase with the self detection drive pulse Sig by the touch detection circuit TC. Note that desirably, the conductive layer on the flexible circuit board FPC4 is driven using the drive pulse substantially at the same amplitude in phase with the self detection drive pulse Sig.

In Exemplary Modification 4, it can be regarded that the conductive layer (104, 104a) or the decorative layer 102a including a conductive material is integrated with the flexible circuit boards FPC3 and FPC4. The conductive layers on the flexible circuit boards FPC3 and FPC4 are provided so as to entirely cover the side DIS of the display controller DI opposite to the display region Ad of the display panel PNL in a planar view.

The configurations in FIGS. 19 and 20 are possible to obtain the effect similar to the effect of the embodiment.

(Exemplary Modification 5)

Figure 21:
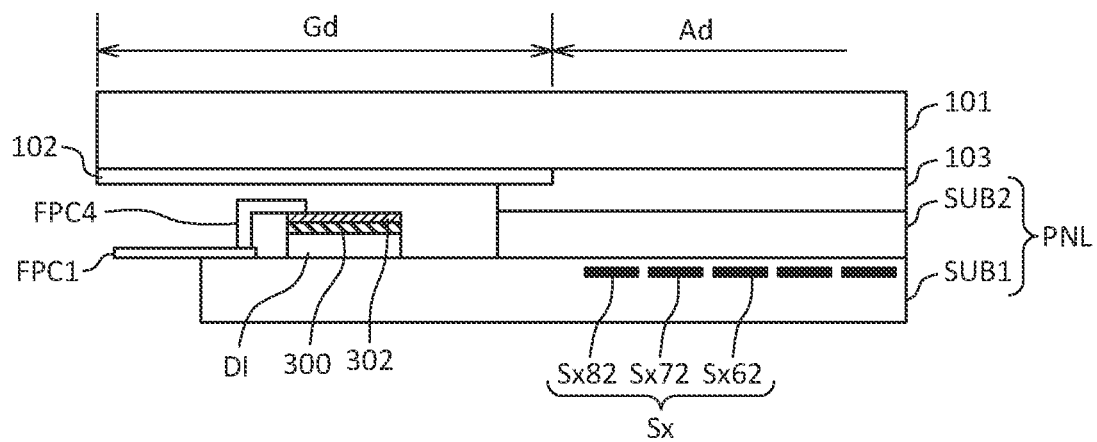
FIG. 21 is a cross sectional view of a sensor-equipped display device in a first configuration according to Exemplary Modification 5.
Figure 22:
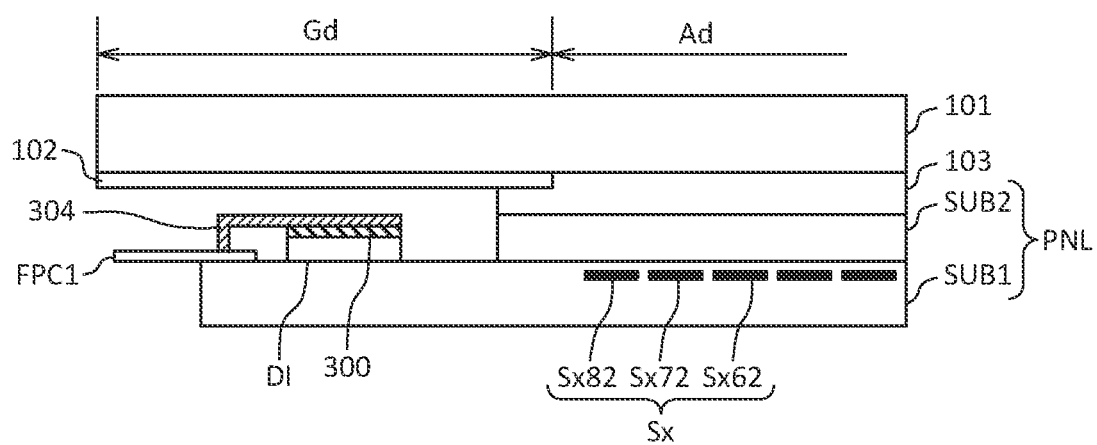
FIG. 22 is a cross sectional view of a sensor-equipped display device in a second configuration according to Exemplary Modification 5.

In Exemplary Modification 5, a configuration will be described in which an insulating film is formed on the back surface of the display controller DI and a conductive layer is further provided on the insulating film. In this case, the conductive layer is formed of a metal electrode or a conductive tape, and the metal electrode or the conductive tape is driven using a drive pulse in phase with the drive pulse Sig applied to the detection electrode Sx. FIG. 21 is a cross sectional view of a sensor-equipped display device in a first configuration according to Exemplary Modification 5. FIG. 22 is a cross sectional view of a sensor-equipped display device in a second configuration according to Exemplary Modification 5.

As shown in FIG. 21, an insulating film 300 is provided on the back surface of the display controller DI, and a metal electrode 302 is provided on the insulating film 300. The metal electrode 302 is electrically connected to one end of the flexible circuit board FPC4. The other end of the flexible circuit board FPC4 is electrically connected to the flexible circuit board FPC1, for example, and the metal electrode 302 is electrically connected to the drive output of the touch detection circuit TC provided on the display controller DI through the flexible circuit board FPC4 and the flexible circuit board FPC1. Thus, the metal electrode 302 can be driven using the drive pulse in phase with the self detection drive pulse Sig applied to the detection electrode Sx by the touch detection circuit TC. Note that desirably, the metal electrode 302 is driven using the drive pulse substantially at the same amplitude in phase with the self detection drive pulse Sig.

As shown in FIG. 22, the insulating film 300 is provided on the back surface of the display controller DI, and the conductive tape 304 is provided on the insulating film 300. One end of the conductive tape 304 is electrically connected to the drive output of the touch detection circuit TC provided on the display controller DI through the flexible circuit board FPC1, for example. Thus, the conductive tape 304 can be driven using the drive pulse in phase with the self detection drive pulse Sig applied to the detection electrode Sx by the touch detection circuit TC. Note that desirably, the conductive tape 304 is driven using the drive pulse substantially at the same amplitude in phase with the self detection drive pulse Sig. The conductive tape 304 may be connected to the drive output of the touch detection circuit TC via a wiring on the first substrate (the array substrate) SUB1, not via the flexible circuit board FPC1.

According to Exemplary Modification 5, the metal electrode 302 or the conductive tape 304 provided on the back surface of the display controller DI functions as the conductive layer 104, and is driven using the drive pulse in phase with the self detection drive pulse Sig applied to the detection electrode Sx, and thus it is possible to suppress the capacitances of the detection electrode Sx and the display controller DI. For this reason, even though the water droplet WTP is attached to the neighboring area across the detection electrode Sx82 and the display controller DI, in the period of the touch detection operation, the malfunction of the touch panel is prevented, and a correct touch detection output can be obtained.

(Exemplary Modification 6)

Figure 23:
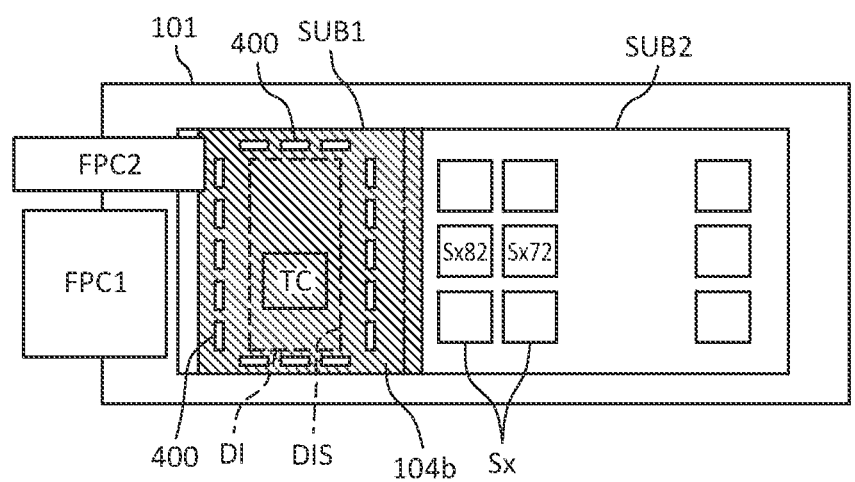
FIG. 23 is a conceptual plan view of a sensor-equipped display device according to Exemplary Modification 6.

The configuration is shown in which the conductive layer 104 shown in FIG. 9 is uniformly formed in a wide area covering the display controller DI using a transparent conductive material such as ITO or a metal material. However, the configuration is not limited to this. The conductive layer 104 may be provided with a plurality of slits like a plurality of openings. FIG. 23 is a conceptual plan view of a sensor-equipped display device according to Exemplary Modification 6. FIG. 23 is different from FIG. 9 in that in FIG. 23, a plurality of slits 400 are provided on a conductive layer 104b. The other configurations are the same as the configurations in FIG. 9. The plurality of slits 400 can also be said as a plurality of openings. The first region 1041 of the conductive layer 104a shown in FIG. 15 or the conductive layer 104a shown in FIG. 15 may be configured like the conductive layer 104b having the plurality of slits 400. The flexible circuit boards FPC3 and FPC4 in FIGS. 19 and 20, the metal electrode 302 in FIG. 21, and the conductive tape 304 in FIG. 22 may also have a configuration provided with a plurality of slits or a plurality of openings.

The conductive layer 104 is not limited to the configuration of the conductive layer 104b having the plurality of slits 400. For example, the conductive layer 104 may have a configuration like metal wirings formed in a mesh form.

As described above, the invention made by the present inventor is specifically described based on the example. However, the present invention is not limited to the foregoing embodiments and modifications, and it is without saying that the invention can be modified variously.

For example, the configuration of the guard ring GR of Exemplary Modification 2 is adoptable to the configurations of the embodiment and Exemplary Modifications 1 and 3 to 6.

All that can be embodied by appropriately modifying the design by a person skilled in the art based on the forgoing display devices as the embodiment of the present invention are also included in the scope of the present invention, as long as these display devices include the gist of the present invention.

In the scope of the idea of the present invention, a person skilled in the art will conceive various exemplary modifications and alternations, and it is interpreted that these exemplary modifications and alternations are also included in the scope of the present invention. For example, ones in which a person skilled in the art appropriately, regarding the foregoing embodiments, adds a component, remove a component, or modifies design, adds a process, omits a process, or modifies the conditions are included in the present invention, as long as the ones include the gist of the present invention.

In regard to the other operations and effects that are achieved from the forms described in the present embodiment, it is interpreted that ones apparent from the present specification or ones appropriately conceived by a person skilled in the art are naturally achieved from the present invention.

It is possible to form various inventions from the appropriate combinations of a plurality of components disclosed in the foregoing embodiments. For example, some components may be removed from all the components shown in the embodiments. Moreover, the components ranging from different embodiments may be appropriately combined.

REFERENCE SIGNS LIST

DSP: display device
PNL: display panel
SUB1: first substrate (array substrate)
SUB2: second substrate (counter substrate)
Sx: detection electrode
DI: display controller (semiconductor device)
TC: touch detection circuit
FPC1, FPC2: flexible circuit board
GR: guard ring (shield electrode)
TGV: via electrode
101: cover member (cover glass)
102: decorative layer
104: conductive layer
300: insulating film
302: metal electrode
304: conductive tape
400: slit

The invention claimed is:

1. A display device comprising:
a display panel having a semiconductor device disposed at an end portion of an array substrate;
a translucent cover member covering the display panel; and
a decorative layer provided between the display panel and the translucent cover member,
wherein the display panel has a plurality of drive electrodes that detect an external proximity object;
a conductive layer is arranged between the translucent cover member and the semiconductor device;
the conductive layer overlaps with all areas of the semiconductor device having a touch detection circuit in a planar view; and
the translucent cover member and the decorative layer are in direct contact, and the decorative layer and the conductive layer are in direct contact.

2. The display device according to claim 1, wherein the conductive layer and the plurality of drive electrodes are driven in phase.

3. The display device according to claim 2, further comprising a flexible circuit board,
wherein the conductive layer is driven through a wiring layer formed on the flexible circuit board.

4. The display device according to claim 3, wherein the conductive layer is a transparent electrode provided on the translucent cover member.

5. The display device according to claim 3, wherein the conductive layer is a metal electrode provided on the translucent cover member.

6. The display device according to claim 5, wherein the conductive layer is not a touch detection electrode and has a slit.

7. The display device according to claim 1,
wherein the plurality of drive electrodes are disposed in a matrix configuration;
the plurality of drive electrodes are shared as a display common electrode; and
touch detection is performed in a self detection mode.

8. The display device according to claim 1,
wherein the plurality of drive electrodes are disposed in a matrix configuration;
the display panel has a plurality of pixel electrodes opposite to the plurality of drive electrodes;
in a display period in which display of the display panel is controlled, a voltage that drives a liquid crystal molecule is supplied across the plurality of drive electrodes and the plurality of pixel electrodes; and
in a touch detection period different from the display period, an alternating signal that detects the external proximity object is supplied to the plurality of drive electrodes, and touch detection is performed in a self detection mode.

9. The display device according to claim 1,
wherein the display panel further has a plurality of detection electrodes extending in a first direction, the plurality of detection electrodes being arrayed (arranged) in a second direction intersecting with the first direction, and the display panel has a counter substrate disposed opposite to the array substrate; and
the display panel further has a plurality of pixel electrodes opposite to the plurality of drive electrodes;
in a display period in which display of the display panel is controlled, a voltage that drives a liquid crystal molecule is supplied across the plurality of drive electrodes and the plurality of pixel electrodes; and
in a touch detection period different from the display period, an alternating signal that detects the external proximity object is supplied to the plurality of drive electrodes, and touch detection is performed in a mutual detection mode in which the external proximity object is detected at the plurality of detection electrodes.

10. The display device according to claim 1,
wherein in a planar view, a shield electrode surrounding the plurality of drive electrodes is included; and
the shield electrode is electrically coupled to the conductive layer.

11. The display device according to claim 10, wherein in a planar view, the shield electrode overlaps with the conductive layer, and a capacitance is provided between the shield electrode and the conductive layer.

12. The display device according to claim 10,
wherein the display panel further has a counter substrate disposed opposite to the array substrate; and
the shield electrode is electrically connected to the conductive layer through a via electrode provided on the counter substrate.

13. The display device according to any one of claims 10 to 12, wherein the shield electrode is provided on a layer equal to the drive electrode.

14. The display device according to claim 1, wherein the conductive layer is a decorative layer having a light shielding property.

15. The display device according to claim 1,
wherein the display panel further has a flexible circuit board;
in a planar view, the conductive layer is provided so as to entirely cover a side of the semiconductor device opposite to a display region of the display panel; and
the conductive layer is driven through a wiring layer formed on the flexible circuit board.

16. The display device according to claim 15, wherein the conductive layer is integrated with the flexible circuit board.

17. The display device according to claim 15, wherein the conductive layer is provided on a back surface of the semiconductor device through an insulating film.

18. The display device according to claim 17, wherein the conductive layer is a conductive tape.

* * * * *